United States Patent
Kuroiwa

(10) Patent No.: US 11,722,609 B2
(45) Date of Patent: Aug. 8, 2023

(54) OPERATION RECEIVING APPARATUS, CONTROL METHOD, IMAGE FORMING SYSTEM, AND RECORDING MEDIUM THAT PERFORM PRINT SETTING BASED ON VOICE AND MANUAL OPERATIONS

(71) Applicant: Konica Minolta, Inc., Tokyo (JP)

(72) Inventor: Tomoko Kuroiwa, Hino (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 17/666,742

(22) Filed: Feb. 8, 2022

(65) Prior Publication Data

US 2022/0159133 A1 May 19, 2022

Related U.S. Application Data

(63) Continuation of application No. 16/823,053, filed on Mar. 18, 2020, now Pat. No. 11,350,001.

(30) Foreign Application Priority Data

Apr. 15, 2019 (JP) .................................. 2019-076943

(51) Int. Cl.
*H04N 1/00* (2006.01)
*G10L 15/22* (2006.01)

(52) U.S. Cl.
CPC .......... *H04N 1/00403* (2013.01); *G10L 15/22* (2013.01); *H04N 1/00424* (2013.01); *H04N 1/00427* (2013.01); *G10L 2015/223* (2013.01)

(58) Field of Classification Search
CPC .......... H04N 1/00403; H04N 1/00424; H04N 1/00427; H04N 1/23; H04N 1/2338; H04N 1/2392; G10L 15/22; G10L 2015/223; G06F 3/1204; G06F 3/1253; G06F 3/1285; G06F 3/167; G06F 3/1205
See application file for complete search history.

(56) References Cited

U.S. PATENT DOCUMENTS

2014/0325360 A1* 10/2014 Jung ..................... G06F 3/0488
715/728
2018/0107435 A1* 4/2018 Fujimoto .............. G06F 3/1205

FOREIGN PATENT DOCUMENTS

| JP | 2002318597 A | 10/2002 |
|----|--------------|---------|
| JP | 2005094380 A | 4/2005 |
| JP | 2008203296 A | 9/2008 |
| JP | 2014203024 A | 10/2014 |

OTHER PUBLICATIONS

English Machine Translation of CN-109614174-A (Li Zizun, Published Apr. 12, 2019) (Year: 2019).*
Office Action issued in corresponding Japanese Patent Application No. 2019-076943 dated Nov. 1, 2022 (10 pages).

* cited by examiner

*Primary Examiner* — Juan M Guillermety
(74) *Attorney, Agent, or Firm* — Osha Bergman Watanabe & Burton LLP

(57) ABSTRACT

An apparatus includes: a display; and a controller that: causes the display to display a plurality of operation items that can be instructed by a user, receives an instruction by a voice operation with respect to at least one of the operation items, and receives an instruction by a manual operation with respect to at least one of the operation items. The display displays a first operation item identifiable from the remaining operation items, and the first operation item can be instructed by a user voice.

10 Claims, 9 Drawing Sheets

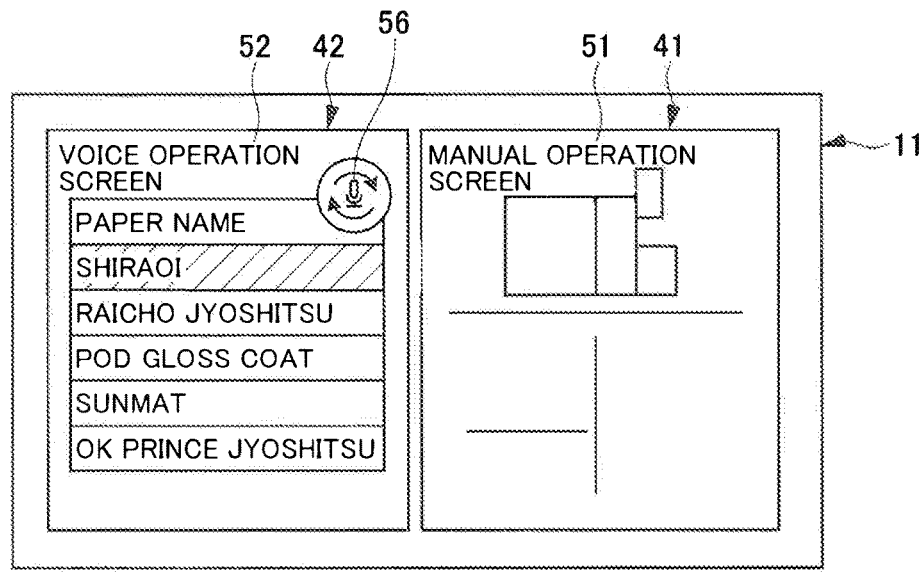

OPERATION RECEIVING APPARATUS, CONTROL METHOD, IMAGE FORMING SYSTEM, AND RECORDING MEDIUM THAT PERFORM PRINT SETTING BASED ON VOICE AND MANUAL OPERATIONS

CROSS-REFERENCE TO RELATED APPLICATION

This application is a continuation application of U.S. patent application Ser. No. 16/823,053, filed on Mar. 18, 2020 and, claims priority to Japanese Patent Application No. 2019-76943, filed on Apr. 15, 2019, both of which are incorporated herein by reference in their entirety.

BACKGROUND

Technical Field

The present invention generally relates to an operation receiving apparatus, a control method, an image forming system, and a recording medium.

Description of Related Art

In a print shop and the print specialized department in a large company (hereinafter, a print shop and the like), a plurality of image forming apparatuses are installed. For example, since a large production printer (PP machine) is expensive, the down time is required to be minimized to enhance the investing effect. Thus, an operator in the print shop and the like is required to minimize the down time of a plurality of PP machines and perform the complicated printing setting for a short time to continuously operate the PP machines.

However, when the image forming apparatus is operated, a large number of complicated printing settings are required to be performed to execute a job. In particular, in the PP machine in which the number of usable paper types and of post-processing types is large, a large number of printing settings are required to be performed to execute the job. To assist the input of the manual printing setting in performing such the complicated printing setting, an image forming apparatus in which the printing setting is inputted by using voice has been proposed (for example, see Patent Literature 1 (JP-2007-18090A) and Patent Literature 2 (JP-2014-112129A)).

PATENT LITERATURE

Patent Literature 1: JP-2007-18090A
Patent Literature 2: JP-2014-112129A

However, in the image forming apparatus, there is the case where the number of functions is large, and there is the case where the number of long and complicated set values, such as a paper name, is large, it is difficult to perform the printing setting for a short time even when the input of the printing setting is assisted by using voice. Thus, an operation receiving apparatus and an image forming system that can perform the printing setting for a shorter time are required.

One or more embodiments of the present invention provide an operation receiving apparatus, a control method, an image forming system, and a recording medium that can perform the printing setting for a short time.

SUMMARY

According to one or more embodiments of the present invention, an apparatus includes: a display; and a controller that: causes the display to display a plurality of operation items that can be instructed by a user, receives an instruction by a voice operation with respect to at least one of the operation items, and receives an instruction by a manual operation with respect to at least one of the operation items, wherein the display displays a first operation item to be identifiable from the remaining operation items, and the first operation item can be instructed by a user voice.

Also, an image forming system of one or more embodiments of the present invention comprises the aforementioned apparatus and an image forming apparatus.

According to one or more embodiments of the present invention, a method includes: causing a display to display a plurality of operation items that can be instructed by a user, receiving an instruction by a voice operation with respect to at least one of the operation items, and receiving an instruction by a manual operation with respect to at least one of the operation items, wherein the display displays a first operation item to be identifiable from the remaining operation items, and the first operation item can be instructed by a user voice.

Also, according to one or more embodiments of the present invention, a non-transitory recoding medium storing a computer readable program for causing a computer to execute: causing a display to display a plurality of operation items that can be instructed by a user, receiving an instruction by a voice operation with respect to at least one of the operation items, and receiving an instruction by a manual operation with respect to at least one of the operation items, wherein the display displays a first operation item to be identifiable from the remaining operation items, and the first operation item can be instructed by a user voice.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention;

FIG. 9A is a diagram illustrating the state where the first display region and the second display region are displayed on the displaying unit according to one or more embodiments;

FIG. 9B is a diagram illustrating the state where a third display region is singly displayed on the displaying unit according to one or more embodiments;

DETAILED DESCRIPTION

Embodiments of the present invention will be described below with reference to the drawings, but the scope of the present invention is not limited to the disclosed embodiments.

Configuration of Image Forming System

Figure 1:
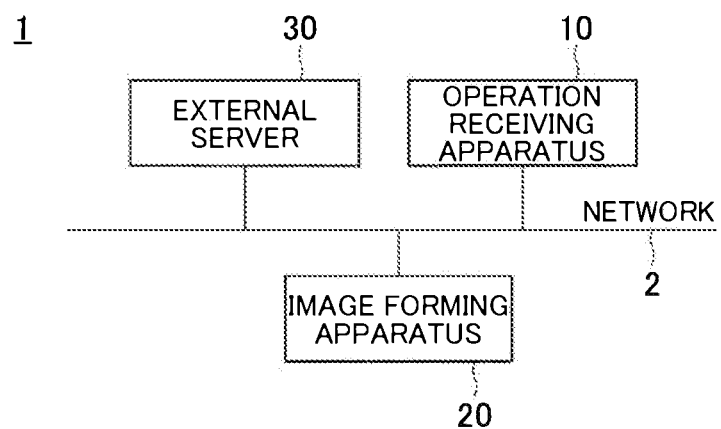
FIG. 1 is a diagram illustrating the configuration of an image forming system according to one or more embodiments.

FIG. 1 illustrates, as a schematic block diagram of an image forming system according to one or more embodiments, a block diagram of the image forming system including an operation receiving apparatus.

FIG. 1 is a block diagram illustrating an example of the configuration of the image forming system. In an image forming system 1 illustrated in FIG. 1, an operation receiving apparatus 10, an image forming apparatus 20, and an external server 30 are communicatively connected via a network 2, such as a LAN (Local Area Network). The network 2 may be wired or wireless. For example, given is an example in which the operation receiving apparatus 10 is connected to the image forming apparatus 20 and the external server 30 via the wireless LAN, and the image forming apparatus 20 is connected to the external server 30 via the wired LAN.

The image forming system 1 receives a printing job from, for example, a PC (Personal Computer) and the like and a tablet terminal that are not illustrated, the operation receiving apparatus 10, and the like, which are connected to the network, and performs various printing according to the job. The terminal device, such as the PC, includes an application creating a printing document, and a printer driver generating the printing job.

Configuration of Image Forming Apparatus

Figure 2:
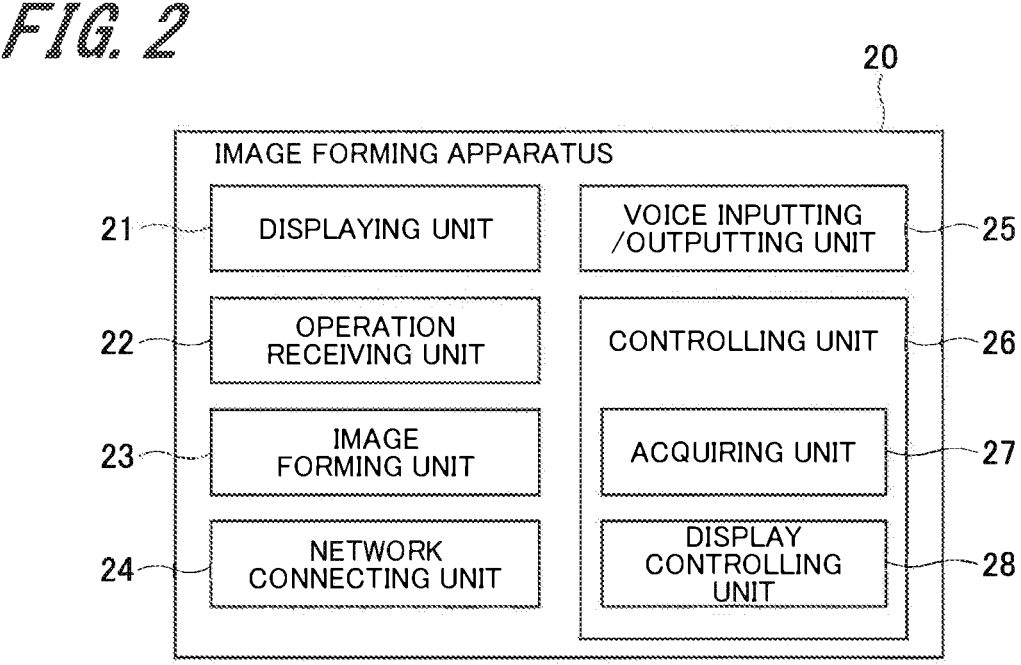
FIG. 2 is a block diagram illustrating the configuration of an image forming apparatus according to one or more embodiments.

Next, FIG. 2 illustrates a block diagram illustrating an example of the configuration of the image forming apparatus 20 of the image forming system 1. The image forming apparatus 20 illustrated in FIG. 2 includes a displaying unit (or display) 21, an operation receiving unit (or user interface) 22, an image forming unit 23, a network connecting unit 24, a voice inputting/outputting unit 25, and a controlling unit (or controller) 26. These blocks are mutually communicatively connected by a system bus, not illustrated.

The controlling unit 26 includes an acquiring unit 27 and a display controlling unit 28. The acquiring unit 27 acquires a recognition result related to the voice of a user. The voice recognition related to the voice of the user is performed by a voice recognizing unit 31 of the external server 30 described later (see FIG. 5). And, the acquiring unit 27 acquires the voice-related recognition result from the voice recognizing unit 31 of the external server 30 via the network 2 and the network connecting unit 14.

The display controlling unit 28 is a processing unit controlling a screen display operation on the displaying unit 21. For example, the display controlling unit 28 displays, on the displaying unit 21, an operation screen and the like for operating the image forming apparatus 20.

The operation receiving unit 22 includes a touch panel and operation keys. The displaying unit 21 includes a display device. The displaying unit 21 and the operation receiving unit 22 are configured, for example, in such a manner that the display device, such as a liquid crystal display device and the position instructing device of the touch panel of the optical type, the electrostatic capacitance type, and the like are overlapped. The operation receiving unit 22 displays the operation screen on the display device, and identifies the position instructed by the user on the operation screen. The controlling unit 26 causes the displaying unit 21 to display the operation screen on the basis of the previously stored data for screen display. An operation signal indicating the identified instruction position on the operation screen (touched position) or the depressed key is inputted to the controlling unit 26. The controlling unit 26 identifies the operation content from the depressed key or the instruction position on the operation screen that is being displayed, and executes the process on the basis of the operation content.

The image forming unit 23 performs image formation printing an image on paper. The voice inputting/outputting unit 25 is a signal converting unit converting the voice of the user to an electric signal. Further, the voice inputting/outputting unit 25 is a signal converter or signal converting unit converting an electric signal instructed by the controlling unit 26 to voice. The voice inputting/outputting unit 25 performs the reception of voice input and voice output by the instruction of the controlling unit 26. The network connecting unit 24 is a communication device or communicating unit performing communication via the network 2.

Figure 3:
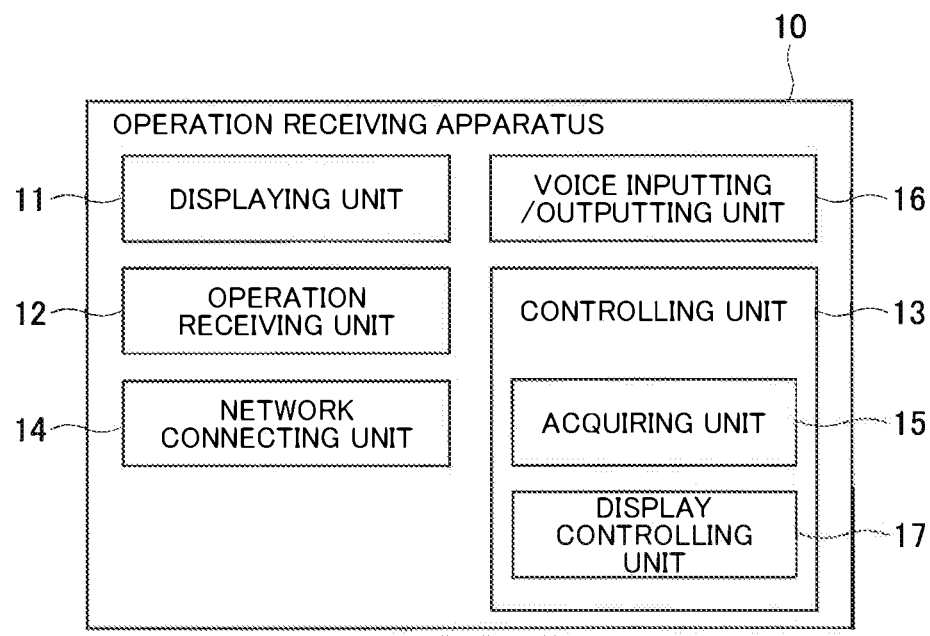
FIG. 3 is a block diagram illustrating the configuration of an operation receiving apparatus according to one or more embodiments.

Next, FIG. 3 illustrates a block diagram illustrating an example of the configuration of the operation receiving apparatus 10 of the image forming system 1. The operation receiving apparatus 10 illustrated in FIG. 3 includes a displaying unit 11, an operation receiving unit 12, a controlling unit 13, a network connecting unit 14, and a voice inputting/outputting unit 16. The controlling unit 13 includes an acquiring unit 15 and a display controlling unit 17.

The displaying unit 11 of the operation receiving apparatus 10 has the same configuration as the displaying unit 21 of the image forming apparatus 20, the operation receiving unit 12 of the operation receiving apparatus 10 has the same configuration as the operation receiving unit 22 of the image forming apparatus 20, the controlling unit 13 of the operation receiving apparatus 10 has the same configuration as the controlling unit 26 of the image forming apparatus 20, the network connecting unit 14 of the operation receiving apparatus 10 has the same configuration as the network connecting unit 24 of the image forming apparatus 20, and the voice inputting/outputting unit 16 of the operation receiving apparatus 10 has the same configuration as the voice inputting/outputting unit 25 of the image forming apparatus 20. Also, the acquiring unit 15 of the controlling unit 13 of the operation receiving apparatus 10 has the same configuration as the acquiring unit 27 of the controlling unit 26 of the image forming apparatus 20, and the display controlling unit 17 of the controlling unit 13 of the operation receiving apparatus 10 has the same configuration as the display controlling unit 28 of the controlling unit 26 of the image forming apparatus 20.

Operation Receiving Unit

Figure 4:
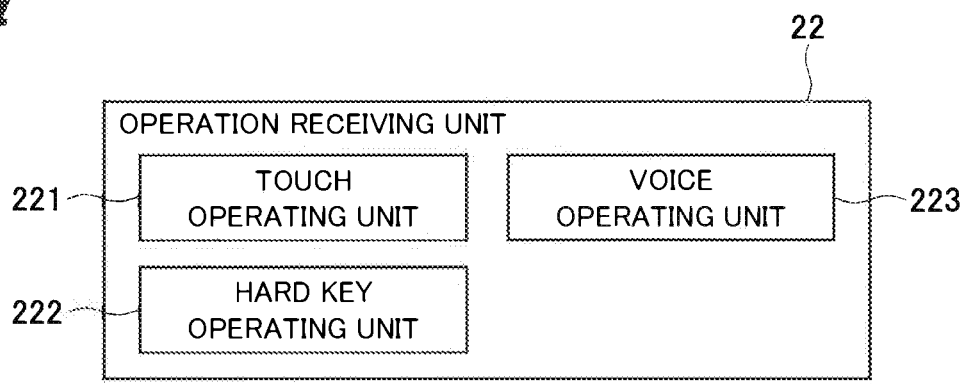
FIG. 4 is a block diagram illustrating the configuration of an operation receiving unit of the image forming apparatus according to one or more embodiments.

FIG. 4 illustrates a block diagram illustrating an example of the configuration of the operation receiving unit 22 of the image forming apparatus 20. The operation receiving unit 22 illustrated in FIG. 4 includes a touch operating unit 221, a hard key operating unit 222, and a voice operating unit 223. It should be noted that the operation receiving unit 12 of the operation receiving apparatus 10 can also have the same configuration as the operation receiving unit 22 of the image forming apparatus 20 described below.

The touch operating unit 221 generates the operation signal according to the operation inputted by the position instructing device of the touch panel of the optical type, the electrostatic capacitance type, and the like disposed to be overlapped with the displaying unit 21. Further, the touch operating unit 221 inputs the generated operation signal to the controlling unit 26. The hard key operating unit 222 recognizes the operation inputted to the hard key disposed in the image forming apparatus 20. The voice operating unit 223 generates the operation signal according to the operation voice inputted from the result of the voice recognition performed by the voice recognizing unit 31 of the external server 30 described later (see FIG. 5). Further, the voice operating unit 223 inputs the generated operation signal to the controlling unit 26.

Configuration of Server

Figure 5:
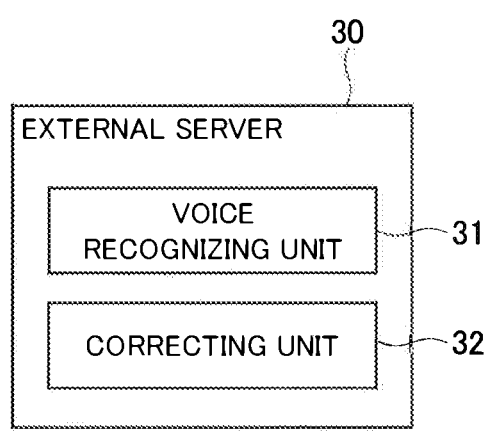
FIG. 5 is a block diagram illustrating the configuration of an external server according to one or more embodiments.

Next, FIG. 5 illustrates a block diagram illustrating an example of the configuration of the external server 30 of the image forming system 1. The external server 30 illustrated in FIG. 5 includes the voice recognizing unit 31 and a correcting unit 32. It should be noted that the operation receiving apparatus 10 or the image forming apparatus 20, not the external server, may have the voice recognizing unit 31 and the correcting unit 32.

The voice recognizing unit 31 receives a voice signal inputted to the voice inputting/outputting unit 25 of the image forming apparatus 20 (FIG. 2) via the network 2. And, the voice recognizing unit 31 recognizes, from the received voice signal, the voice of the operation instruction with respect to the image forming system 1. Further, the voice recognizing unit 31 notifies the controlling unit 13 of the operation receiving apparatus 10 and the controlling unit 26 of the image forming apparatus 20 of the recognized operation instruction content. The controlling unit 13 of the operation receiving apparatus 10 instructs the operation receiving apparatus 10 to execute the predetermined process according to the operation instruction content notified from the voice recognizing unit 31, and the controlling unit 26 of the image forming apparatus 20 instructs the image forming apparatus 20 to execute the predetermined process according to the operation instruction content notified from the voice recognizing unit 31.

The correcting unit 32 corrects the information (content) of the inputted voice signal to the operable content closer thereto so that the inputted voice signal matches the operation content that can be recognized by the voice recognizing unit 31. For example, the correcting unit 32 is caused to learn the word that fails in the voice recognition, and on the basis of this learning data, corrects the information of the voice signal so that it matches the operable content.

The external server 30 can be achieved by a typical computer, such as a personal computer. Thus, the hardware configuration of the external server 30 can be the same as the hardware configuration of the typical computer. Thus, the detailed description of the hardware configuration of the external server 30 is omitted. For example, like the controlling unit 13 described later and illustrated in FIG. 6, the external server 30 can be configured of a CPU (Central Processing Unit), a ROM (Read Only Memory), a RAM (Random Access Memory), the network connecting unit, and the like.

Controlling Unit

Next, the configurations of the controlling unit 13 of the operation receiving apparatus 10 and the controlling unit 26 of the image forming apparatus 20 will be described. The controlling unit 13 of the operation receiving apparatus 10 will be described below as an example, but the controlling unit 26 of the image forming apparatus 20 can have the same configuration.

Figure 6:
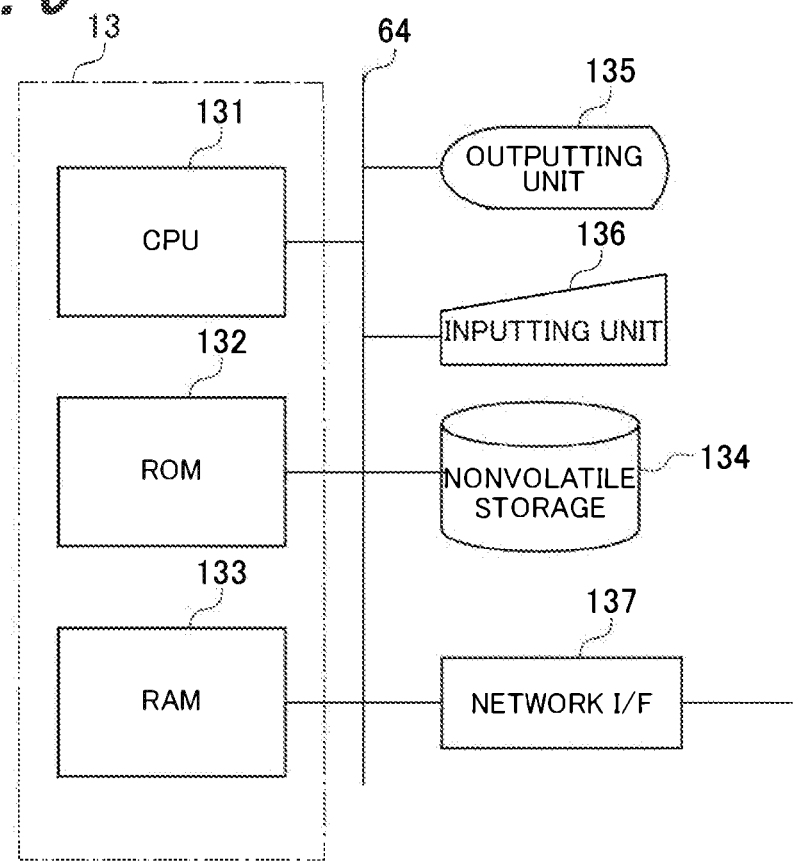
FIG. 6 is a block diagram illustrating the configuration of a controlling unit according to one or more embodiments.

As illustrated in FIG. 6, the controlling unit 13 is configured of a CPU 131, a ROM 132, and a RAM 133. The controlling unit 13 is used as an example of a computer controlling the operation of each unit in the operation receiving apparatus 10.

The CPU 131 generates the printing job by operating the printer driver according to the input operation by the user performed through, for example, an inputting unit 136. The CPU 131 is an example of the controlling unit, and reads the program code of the software achieving each function according to one or more embodiments from the ROM 132 (an example of a recording medium) to execute it. It should be noted that in place of the CPU 131, other calculating devices, such as an MPU (Micro Processing Unit), may be used as a calculating unit.

The ROM 132 is used as an example of a nonvolatile memory, and stores the program, data, and the like necessary for the CPU 131 to operate.

The RAM 133 is used as an example of a volatile memory, and temporarily stores the information (data) necessary for each process performed by the CPU 131.

An outputting unit 135 is configured of, for example, a display device, such as a liquid crystal display monitor, a speaker, and the like. The outputting unit 135 corresponds to the function of the displaying unit 11 and the voice inputting/outputting unit 16, and outputs the result and the like of the process performed by the controlling unit 13.

The inputting unit 136 is configured of, for example, a keyboard, a mouse, a touch panel, or the like. The inputting unit 136 corresponds to the function of the operation receiving unit 12 and the voice inputting/outputting unit 16, the user performs the predetermined operation, and the inputting unit 136 receives the input of the operation instruction.

A nonvolatile storage 134 is an example of a recording material, and stores the program for the CPU 131 to control each unit, the program, such as the OS, and data. As the nonvolatile storage 134, for example, an HDD, an SSD (Solid State Drive), an optical disk, a magneto-optical disk, a CD-ROM, a CD-R, a magnetic tape, a nonvolatile memory card, and the like are used.

A network I/F (interface) 137 is configured of, for example, an NIC (Network Interface Card), a modem, and the like, establishes the connection with the device of the communication party via the network 2, such as the LAN, and executes the transmission and reception of various data.

Control of Displaying Unit by Controlling Unit

Next, the control of the screen display of the displaying unit 11 performed by the controlling unit 13 of the operation receiving apparatus 10 and the control of the screen display of the displaying unit 21 performed by the controlling unit 26 of the image forming apparatus 20 will be described. The control of the screen display of the displaying unit 11 performed by the controlling unit 13 of the operation receiving apparatus 10 will be described below as an example, but the screen display of the displaying unit 21 performed by the controlling unit 26 of the image forming apparatus 20 can be controlled in the same manner.

Control-1

Figure 7:
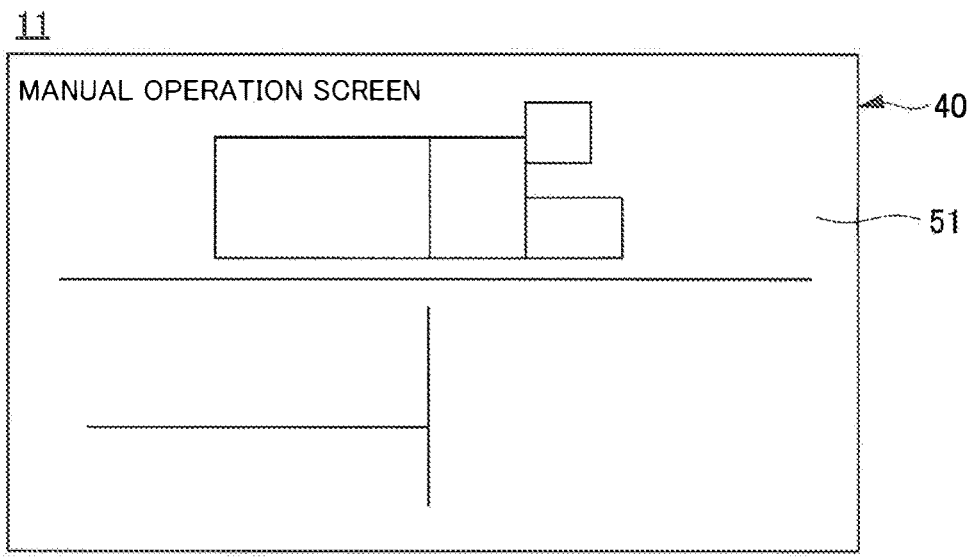
FIG. 7 is a diagram illustrating an initial screen displayed at the start of the operation by a user according to one or more embodiments.

FIG. 7 illustrates an example of an initial screen displayed at the start of the operation by the user on the displaying unit 11 of the operation receiving apparatus 10. An initial screen 40 illustrated in FIG. 7 displays only a single manual operation screen 51 displaying, in the display region of the displaying unit 11, an item that can receive an instruction by a manual operation from the user (operation item).

Figure 8:
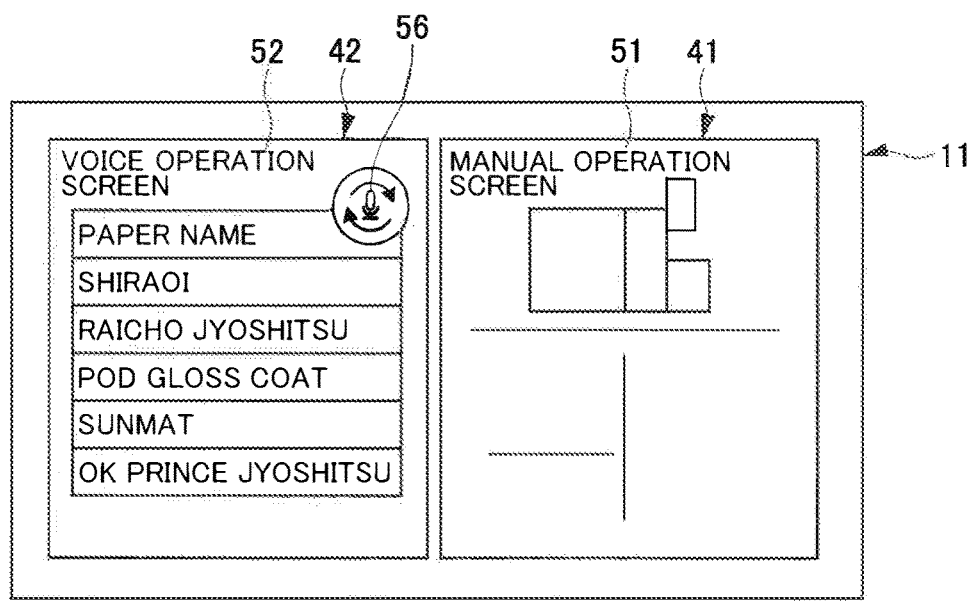
FIG. 8 is a diagram illustrating the state where a first display region and a second display region are displayed on a displaying unit according to one or more embodiments.

FIG. 8 illustrates the screen display of the displaying unit 11 when the operation receiving apparatus 10 has acquired, from the voice recognizing unit 31, the recognition result of the operation instruction with respect to the image forming system 1 by the voice input by the user. As illustrated in FIG. 8, the controlling unit 13 of the operation receiving apparatus 10 performs the control to display, on the displaying unit 11, a first display region 41 and a second display region 42. The first display region 41 displays an item that can receive an instruction by the manual operation from the user. The second display region 42 displays an item that can be instructed by the voice of the user. In FIG. 8, the manual operation screen 51 displaying the item that can be manually operated by the user is displayed in the first display region 41 to be reduced in size. And, a voice operation screen 52 displaying the item that can be voice instructed by the user is displayed in the second display region 42. The second display region 42 displays an icon 56 of a microphone so as to indicate that the voice operation screen 52 is the screen displayed by the voice input. Also, when the microphone icon 56 is displayed, this indicates that the voice input by the voice inputting/outputting unit 16 is enabled.

As illustrated in FIG. 8, the controlling unit 13 displays the manual operation screen 51 and the voice operation screen 52 on the displaying unit 11 in such a manner that they can be operated in parallel, so that the voice operation and the manual operation can be performed in parallel. Thus, the operation receiving apparatus 10 can perform the complicated printing setting for a short time.

Also, when the operation intended by the user by the voice operation has not been performed on the voice operation screen, and when the voice operation screen intended by the user by the voice operation has not been displayed, the normal manual operation screen 51 is displayed in parallel with the voice operation screen 52, so that the voice operation and the manual operation can be easily retried.

Control-2

Also, in the state where the first display region 41 and the second display region 42 are displayed (FIG. 8), and when the manual operation with respect to the second display region 42 has been received, the controlling unit 13 performs the control to display a third display region 43 on the displaying unit 11. The third display region 43 displays the item that can receive the instruction by the manual operation from the user. FIGS. 9A and 9B illustrate an example of the screen display of the displaying unit 11 when the control to display the third display region 43 on the displaying unit 11 has been performed.

FIG. 9A illustrates the state where the manual operation screen 51 is displayed in the first display region 41 and the voice operation screen 52 is displayed in the second display region 42. In this state, when the user has performed the manual operation on the voice operation screen 52 in the second display region 42, the controlling unit 13 performs the control to display the third display region 43, as illustrated in FIG. 9B. The third display region 43 displays, on the displaying unit 11, the item that reflects the display content of the second display region 42 and can be manually operated by the user.

Also, when as illustrated in FIG. 9B, performing the control to display a manual operation screen 53 in the third display region 43, the controlling unit 13 can perform the control to singly display only the third display region 43 on the displaying unit 11.

Further, when performing the control to display the manual operation screen 53 in the third display region 43 illustrated in FIG. 9B, the controlling unit 13 can perform the control to receive only the input by the manual operation with respect to the display content of the third display region 43. FIG. 9B illustrates that the microphone icon 56 is gray-out displayed and the voice input is not enabled.

It should be noted that in the third display region 43, the microphone icon 56 for switching the manual operation mode to the voice operation mode can be displayed. By displaying the microphone icon 56, the manual operation mode can be immediately switched to the voice operation mode even after the voice operation screen has been changed to the manual operation screen.

By performing the above control, the input by the manual operation can be performed with respect to the item displayed on the voice input screen after the voice input screen has been started up. For example, when only the start-up of the screen is performed by voice and the operation thereafter is performed by the manual operation, the voice operation screen can be immediately switched to the manual operation screen. Thus, this is effective when the complicated printing setting in the operation receiving apparatus 10 is performed for a short time.

Control-3

Figure 10A:
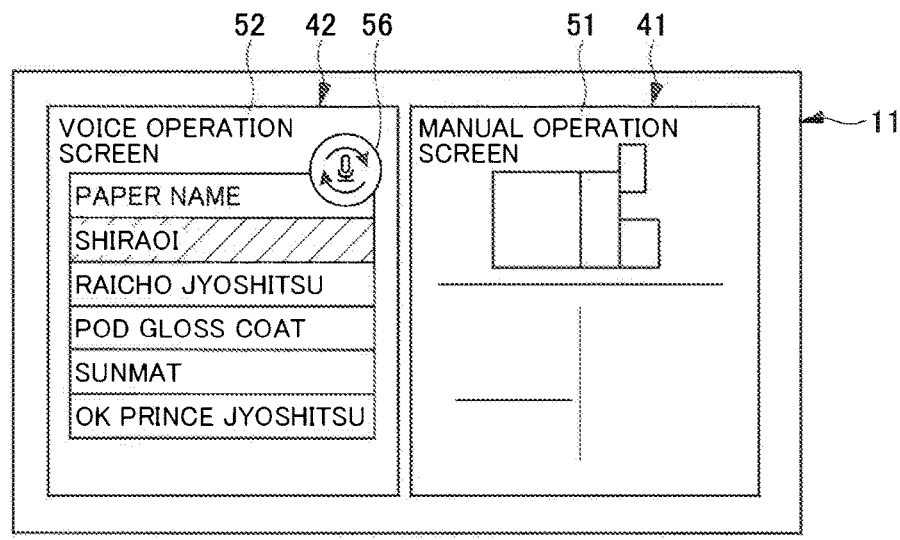
FIG. 10A is a diagram illustrating the state where the first display region and the second display region are displayed on the displaying unit according to one or more embodiments.
Figure 10B:
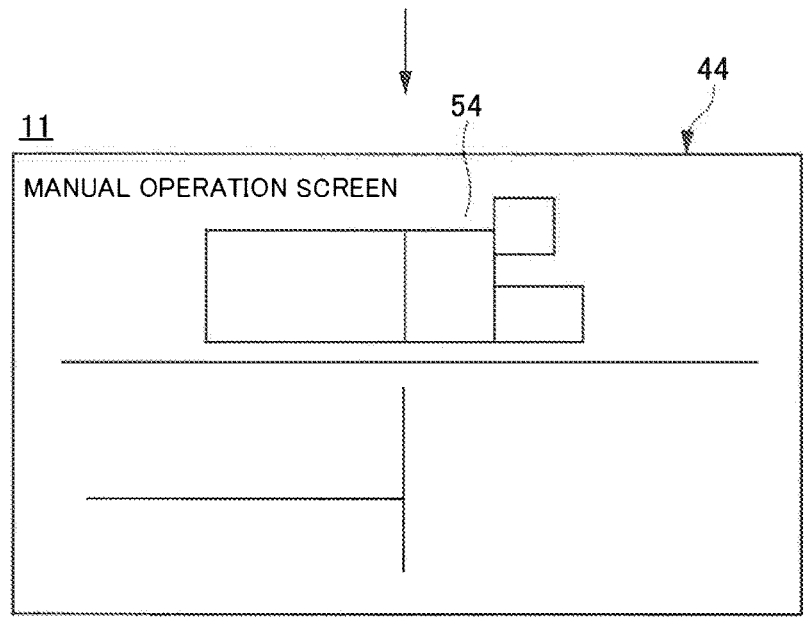
FIG. 10B is a diagram illustrating the state where the third display region is singly displayed on the displaying unit according to one or more embodiments.

Also, in the state where the first display region 41 and the second display region 42 are displayed (FIG. 8), and when the manual operation with respect to the second display region 42 has been received, the controlling unit 13 performs the control to display the third display region 43 on the displaying unit 11. The third display region 43 displays the item that can receive the instruction by the manual operation from the user. FIGS. 10A and 10B illustrate an example of the screen display of the displaying unit 11 when the control to display the third display region 43 on the displaying unit 11 has been performed.

FIG. 10A illustrates the state where the manual operation screen 51 is displayed in the first display region 41 and the voice operation screen 52 is displayed in the second display region 42. In this state, when the user has performed the manual operation on the voice operation screen 52 in the second display region 42, the controlling unit 13 performs the control to display a third display region 44, as illustrated in FIG. 10B. The third display region 44 displays, on the displaying unit 11, the item that reflects the display content of the first display region 41 and can be manually operated by the user.

Also, when as illustrated in FIG. 10B, performing the control to display a manual operation screen 54 in the third display region 44, the controlling unit 13 can perform the control to singly display only the third display region 44 on the displaying unit 11.

By performing the above control, the voice operation screen can be cleared to return to the screen displaying only the manual operation screen, that is, the initial screen, even after the voice input screen has been started up. Thus, when the unnecessary voice operation screen has been displayed in the operation of the operation receiving apparatus 10, the voice operation screen can be immediately cleared to display only the initial screen.

Control-4

Figure 11A:
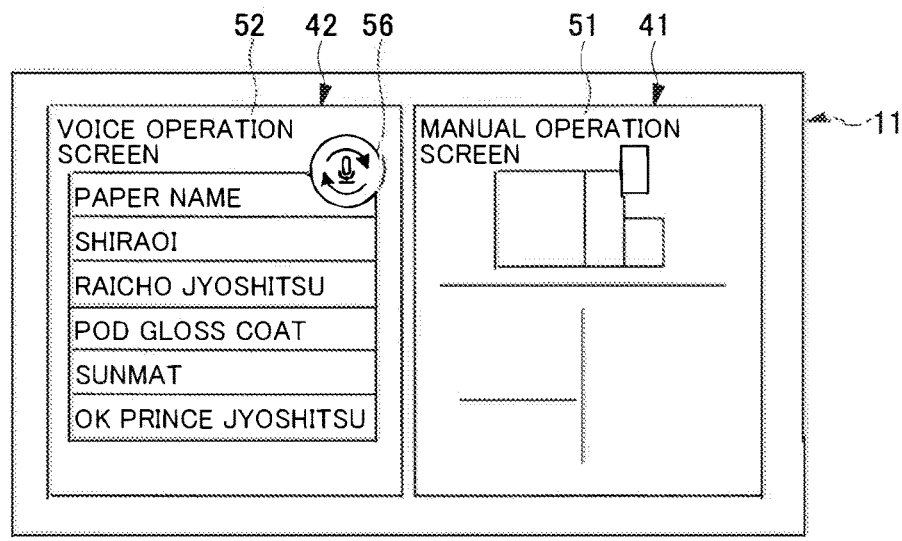
FIG. 11A is a diagram illustrating the state where the first display region and the second display region are displayed on the displaying unit according to one or more embodiments.
Figure 11B:
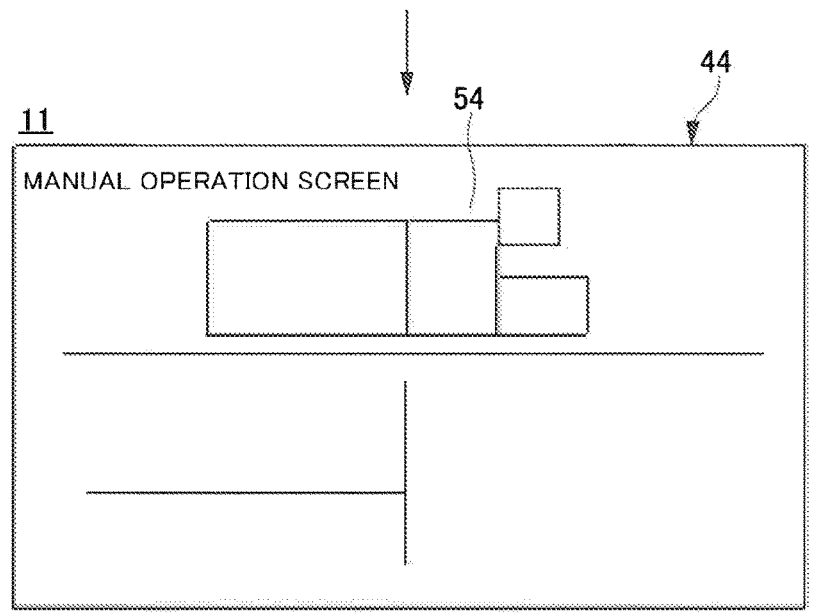
FIG. 11B is a diagram illustrating the state where the third display region is singly displayed on the displaying unit according to one or more embodiments.

Also, in the state where the first display region 41 and the second display region 42 are displayed (FIG. 8), and when the manual operation with respect to the first display region 41 has been received, the controlling unit 13 performs the control to display the third display region 43 on the displaying unit 11. The third display region 43 displays the item that can receive the instruction by the manual operation from the user. FIGS. 11A and 11B illustrate an example of the screen display of the displaying unit 11 when the control to display the third display region 43 on the displaying unit 11 has been performed.

FIG. 11A illustrates the state where the manual operation screen 51 is displayed in the first display region 41 and the voice operation screen 52 is displayed in the second display region 42. In this state, when the user has performed the manual operation on the manual operation screen 51 in the first display region 41, the controlling unit 13 performs the control to display the third display region 44, as illustrated in FIG. 11B. The third display region 44 displays, on the displaying unit 11, the item that reflects the display content of the first display region 41 and can be manually operated by the user.

Also, when as illustrated in FIG. 11B, performing the control to display the manual operation screen 54 in the third display region 44, the controlling unit 13 can perform the control to singly display only the third display region 44 on the displaying unit 11.

By performing the above control, the voice operation screen can be cleared to return to the screen displaying only the manual operation screen, that is, the initial screen, even after the voice input screen has been started up. Thus, when the unnecessary voice operation screen has been displayed in the operation of the operation receiving apparatus 10, the voice operation screen can be immediately cleared to display only the initial screen.

Control-5

Figure 12A:
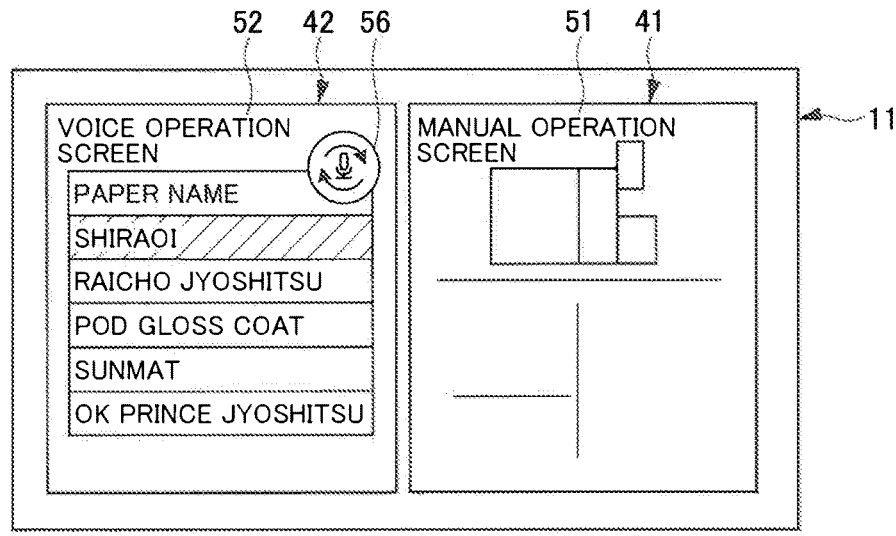
FIG. 12A is a diagram illustrating the state where the first display region and the second display region are displayed on the displaying unit according to one or more embodiments.
Figure 12B:
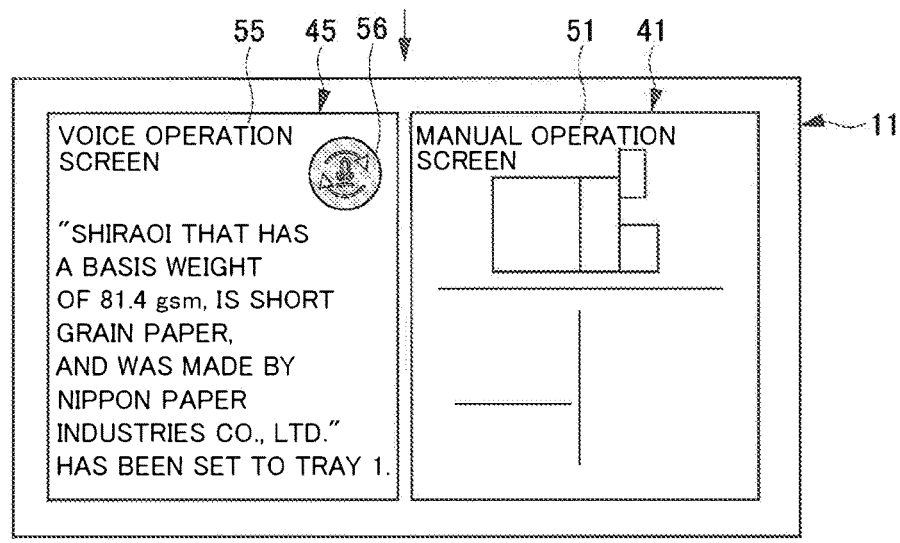
FIG. 12B is a diagram illustrating the state where the third display region and the first display region are displayed on the displaying unit according to one or more embodiments.
Figure 12C:
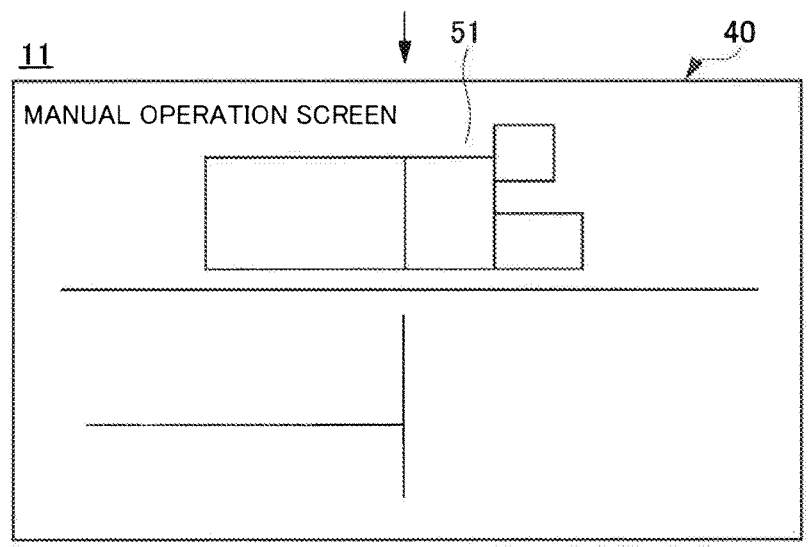
FIG. 12C is a diagram illustrating the state where the initial screen is singly displayed on the displaying unit according to one or more embodiments.

Also, in the state where the first display region 41 and the second display region 42 are displayed (FIG. 8), and when the voice operation or the manual operation with respect to the second display region 42 has been received, the controlling unit 13 performs the control to voice output the content of the received operation or the control to display the content of the received operation on the displaying unit 11. The controlling unit 13 may perform both of the control for the voice output and the control for the display on the displaying unit 11, or one of the controls. FIGS. 12A, 12B, and 12C illustrate an example of the screen display of the displaying unit 11 when the control for the voice output and the control for the display on the displaying unit 11 have been performed.

FIG. 12A illustrates the state where the manual operation screen 51 is displayed in the first display region 41 and the voice operation screen 52 is displayed in the second display region 42. In this state, when the user has performed the manual operation or the voice operation on the voice operation screen 52 in the second display region 42, the controlling unit 13 performs the control to display a third display region 45, as illustrated in FIG. 12B. The third display region 45 displays a voice operation screen 55 displaying the operation content with respect to the second display region 42 on the displaying unit 11. Further, the controlling unit 13 performs the control to voice output the operation content with respect to the second display region 42 on the displaying unit 11 from the voice inputting/outputting unit 16 of the operation receiving apparatus 10 with the control to display the voice operation screen 55 in the third display region 45.

Also, when the voice operation or the manual operation with respect to the second display region 42 has been received and a set value with respect to the setting item has been determined, the controlling unit 13 performs the control to display the third display region 45, as illustrated in FIG. 12B. The third display region 45 displays the determined set value. Further, the controlling unit 13 performs the control to voice output the determined set value with the control to display the determined set value in the third display region 45.

Further, after the set value has been determined, the controlling unit 13 performs the control to stop the display of the third display region 45. With this, as illustrated in FIG. 12C, the controlling unit 13 performs the control to return to the initial screen 40 displaying only the single manual operation screen 51 (the same screen as FIG. 7) in the display region for the display content on the displaying unit 11.

Also, when the manual operation with respect to the manual operation screen 51 in the first display region 41 has been received during the control of the voice output illustrated in FIG. 12B, the controlling unit 13 can perform the control to stop the voice output. In this case, after stopping the voice output, the controlling unit 13 performs the control to return to the initial screen 40 displaying only the single manual operation screen 51 in the display region for the display content on the displaying unit 11, as illustrated in FIG. 12C.

As described above, when the user has performed the manual operation or the voice operation on the voice operation screen 52 in the second display region 42, the controlling unit 13 displays the operation content in the third display region 45, and voice outputs the operation content. With this, the user can check the operation content.

Also, when the manual operation has been performed during the voice output, the voice output is stopped to display the manual operation screen, so that the next setting operation can be immediately performed. Further, when the set value has been determined, the control to return the display screen to the initial screen is performed, so that the next setting operation can be immediately performed.

Flowchart of Control Method of Operation Reception

Figure 13:
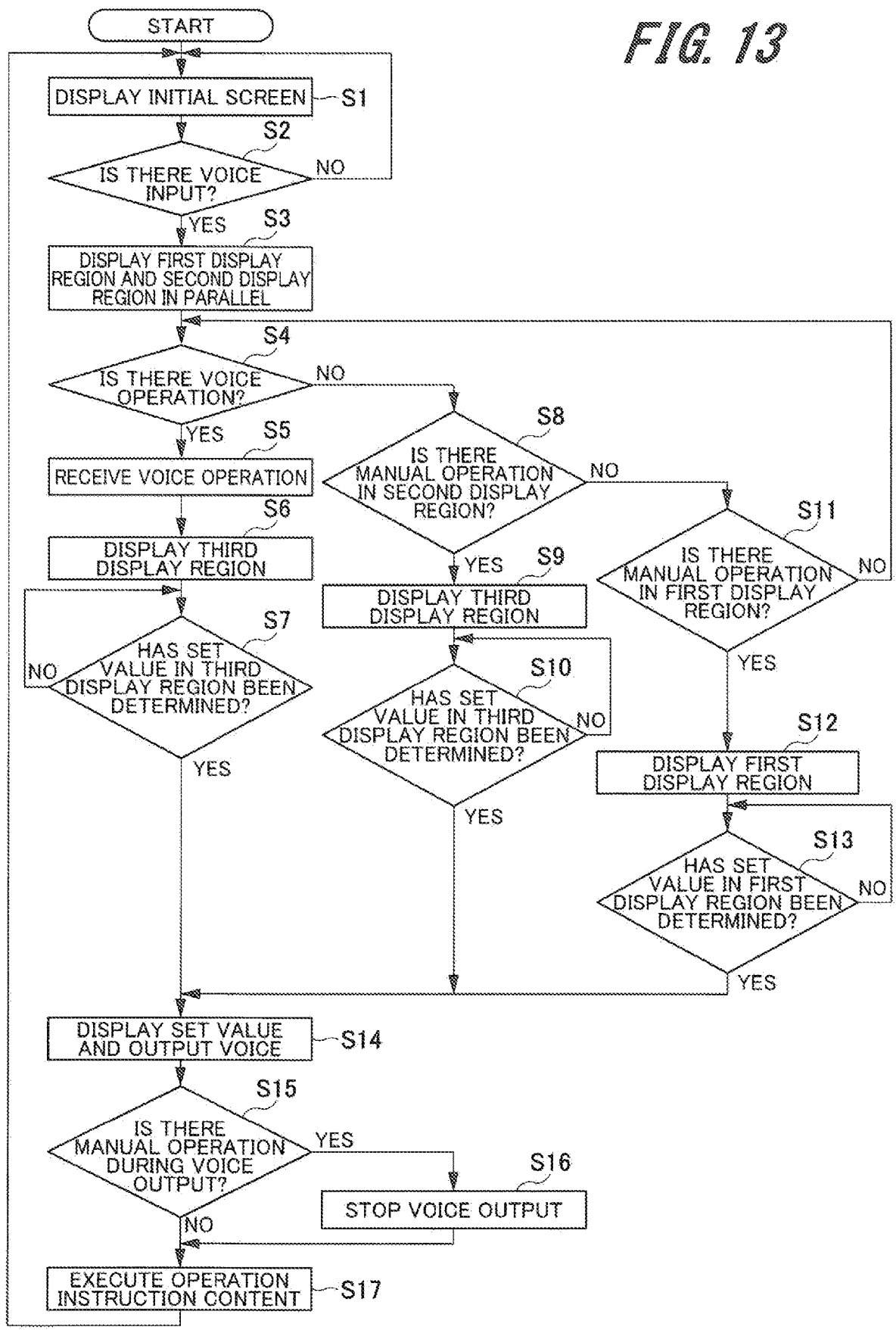
FIG. 13 is a flowchart of a control method of operation reception according to one or more embodiments.

Next, FIG. 13 illustrates a flowchart of an operation example when the controlling unit 13 of the operation receiving apparatus 10 performs the control of the screen display of the displaying unit 11 and an operation example when the controlling unit 26 of the image forming apparatus 20 performs the control of the screen display of the displaying unit 21. The process of the flowchart illustrated in FIG. 13 is executed when the controlling unit 13 of the operation receiving apparatus 10 or the controlling unit 26 of the image forming apparatus 20 has received the operation by the user. The control of the screen display of the displaying unit 11 by the controlling unit 13 of the operation receiving apparatus 10 will be described below as an example. The process of the flowchart illustrated in FIG. 13 is achieved in such a manner that the CPU 131 of the operation receiving apparatus 10 executes the program stored in the ROM 132. Likewise, the screen display of the displaying unit 21 by the controlling unit 26 of the image forming apparatus 20 is also achieved.

First, the controlling unit 13 displays the initial screen 40 on the displaying unit 11, as illustrated in FIG. 7, with the start of the operation of the operation receiving apparatus 10 by the user (step S1).

Next, the operation receiving apparatus 10 determines whether the recognition result of the voice input by the user by the voice recognizing unit 31 has been acquired from the external server 30 (step S2). When the operation receiving apparatus 10 has not acquired the recognition result of the voice input from the external server 30 (NO in step S2), the controlling unit 13 continues the display of the initial screen 40 until it acquires the recognition result.

When the operation receiving apparatus 10 has acquired the recognition result of the voice input from the external server 30 (YES in step S2), the controlling unit 13 displays, in parallel on the displaying unit 11, the first display region 41 that can receive the instruction by the manual operation from the user and the second display region 42 displaying the item that can be instructed by the voice of the user (step S3), as illustrated in FIG. 8.

Next, the controlling unit 13 of the operation receiving apparatus 10 determines whether the operation receiving apparatus 10 has acquired the recognition result of the voice operation by the user from the external server 30 (step S4).

When the operation receiving apparatus 10 has acquired the recognition result of the voice operation by the user from the external server 30 (YES in step S4), the controlling unit 13 receives the voice operation by the user (step S5). And, as illustrated in FIG. 12B, the controlling unit 13 performs the control to display, in the third display region 45, the voice operation screen 55 displaying the operation content with respect to the second display region 42 of the displaying unit 11 (step S6).

Next, the controlling unit 13 of the operation receiving apparatus 10 determines whether the set value has been determined with respect to the display content of the third display region 45 by the manual operation or the voice operation by the user (step S7). When the set value has not been determined (NO in step S7), the controlling unit 13 continues the display of the third display region 45 until the set value is determined.

On the other hand, when the operation receiving apparatus 10 has not acquired the recognition result of the voice operation by the user from the external server 30 (NO in step S4), the controlling unit 13 of the operation receiving apparatus 10 determines whether the manual operation with respect to the second display region 42 has been performed (step S8).

When the manual operation with respect to the second display region 42 has been performed (YES in step S8), the controlling unit 13 displays the third display region 43 on the displaying unit 11 (step S9). The controlling unit 13 displays, on the displaying unit 11, the third display region 43 including the manual operation screen 53 illustrated in FIG. 9B and displaying the item that reflects the display content of the second display region 42 and can be manually operated by the user. Also, as illustrated in FIG. 10B, the controlling unit 13 may display, on the displaying unit 11, the third display region 44 including the manual operation screen 54 displaying the item that reflects the display content of the first display region 41 and can be manually operated by the user.

Next, the controlling unit 13 of the operation receiving apparatus 10 determines whether the set value has been determined with respect to the display content of the third display region 43 or 44 by the manual operation by the user (step S10). When the set value has not been determined (NO in step S10), the display of the third display region 43 or 44 is continued until the set value is determined.

When the manual operation with respect to the second display region 42 has not been performed (NO in step S8), the controlling unit 13 of the operation receiving apparatus 10 determines whether the manual operation with respect to the first display region 41 has been performed (step S11). When the manual operation with respect to the first display region 41 has not been performed (NO in step S11), the process for determining whether the recognition result of the voice operation by the user has been acquired from the external server 30 (step S4) is repeated.

When the manual operation with respect to the first display region 41 has been performed (YES in step S11), the controlling unit 13 displays the third display region 44 on the displaying unit 11 (step S12). At this time, as illustrated in FIG. 11B, the controlling unit 13 can singly display only the third display region 44 on the displaying unit 11.

Next, the controlling unit 13 of the operation receiving apparatus 10 determines whether the set value has been determined with respect to the display content of the first display region 41 by the manual operation by the user (step S13). When the set value has not been determined (NO in step S13), the controlling unit 13 continues the display of the first display region 41 until the set value is determined.

When the set value has been determined with respect to the display content of the third display region 45 (YES in step S7), when the set value has been determined with respect to the display content of the third display region 43 or 44 (YES in step S10), or when the set value has been determined with respect to the display content of the first display region 41 (YES in step S13), the controlling unit 13 performs the control to display the determined set value on the displaying unit 11 and the control to voice output the determined set value from the voice inputting/outputting unit 16 of the operation receiving apparatus 10 (step S14).

Further, the controlling unit 13 determines whether the manual operation has been performed during the voice output in step S14 (step S15). When the manual operation has been performed during the voice output (YES in step S15), the controlling unit 13 performs the control to stop the voice output (step S16). At this time, as illustrated in FIG. 12C, the controlling unit 13 may perform the control to display the initial screen 40 with the stop of the voice output.

When the manual operation has not been performed during the voice output (NO in step S15), and after the control to stop the voice output in step S16 has been performed, the controlling unit 13 of the operation receiving apparatus 10 receives, as the operation instruction content, the determined set value, and executes the setting of the determined set value (step S17). After executing the setting of the set value, the controlling unit 13 returns to step S1 displaying the initial screen 40 on the displaying unit 11, and ends the process by this flowchart.

According to one or more embodiments of the present invention, it is possible to provide the operation receiving apparatus, the control method, the image forming system, and the recording medium that can perform the printing setting for a short time.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 1 image forming system, 10 operation receiving apparatus, 11, 21 displaying unit, 12, 22 operation receiving unit, 13, 26 controlling unit, 14, 24 network connecting unit, 15 acquiring unit, 16, 25 voice inputting/outputting unit, 2 network, 20 image forming apparatus, 23 image forming unit, 30 external server, 31 voice recognizing unit, 32 correcting unit, 40 initial screen, 41 first display region, 42 second display region, 43, 44, 45 third display region, 51, 53, 54 manual operation screen, 52, 55 voice operation screen, 56 icon, 131 CPU, 132 ROM, 133 RAM, 134 nonvolatile storage, 221 touch operating unit, 222 hard key operating unit, 223 voice operating unit

What is claimed is:

1. An apparatus comprising:
a display; and
a controller that:
causes the display to display, on a display screen of the display, a plurality of operation items that can be instructed by a user,
receives an instruction by a voice operation with respect to at least one of the operation items, and
receives an instruction by a manual operation with respect to at least one of the operation items, wherein
the display displays, on the display screen, a first operation item that can be instructed by a user voice to be distinguishable from the remaining operation items that cannot be instructed by the user voice.

2. The apparatus according to claim 1, wherein the controller receives, with respect to a second operation item among the operation items displayed on the display, the instruction by the manual operation on the display screen.

3. The apparatus according to claim 1, wherein the controller receives, with respect to the first operation item, the instruction by the manual operation.

4. The apparatus according to claim 3, wherein
in a state where the first operation item and the second operation item are displayed on the display, the controller switches the display from a first state to a second state based on an instruction by the user,
in the first state, the instruction by the manual operation cannot be performed with respect to the first operation item,
in the second state, the instruction by the manual operation can be performed with respect to the first operation item, and
the controller receives, with respect to the first operation item, the instruction by the manual operation after the first state has been switched to the second state.

5. The apparatus according to claim 1, wherein
the first operation item is displayed in a first region of a display region of the display, and
the second operation item is displayed in a second region of the display region of the display.

6. A non-transitory recording medium storing a computer readable program for causing a computer to execute:
causing a display to display, on a display screen of the display, a plurality of operation items that can be instructed by a user,
receiving an instruction by a voice operation with respect to at least one of the operation items, and
receiving an instruction by a manual operation with respect to at least one of the operation items, wherein
the display displays, on the display screen, a first operation item that can be instructed by a user voice to be distinguishable from the remaining operation items that cannot be instructed by the user voice, and
the first operation item can be instructed by a user voice.

7. The non-transitory recording medium according to claim 6, wherein the computer further executes:
receiving, with respect to a second operation item among the operation items displayed on the display, the instruction by the manual operation on the display screen.

8. The non-transitory recording medium according to claim 6, wherein
the computer further executes:
receiving, with respect to the first operation item, the instruction by the manual operation.

9. The non-transitory recording medium according to claim 6, wherein
in a state where the first operation item and the second operation item are displayed on the display, the computer further executes:
switching the display from a first state to a second state based on an instruction by the user,
in the first state, the instruction by the manual operation cannot be performed with respect to the first operation item,
in the second state, the instruction by the manual operation can be performed with respect to the first operation item, and
the computer further executes:
receiving, with respect to the first operation item, the instruction by the manual operation after the first state has been switched to the second state.

10. The non-transitory recording medium according to claim 6, wherein the first operation item is displayed in a first region of a display region of the display, and the second operation item is displayed in a second region of the display region of the display.

\* \* \* \* \*